(12) United States Patent
Roe et al.

(10) Patent No.: US 7,398,987 B2
(45) Date of Patent: Jul. 15, 2008

(54) INDUSTRIAL E-HITCH TRAILER COUPLER

(75) Inventors: David O. Roe, Grand Haven, MI (US); John T. Buckley, Holland, MI (US)

(73) Assignee: SAF-Holland, Inc., Holland, MI (US)

( * ) Notice: Subject to any disclaimer, the term of this patent is extended or adjusted under 35 U.S.C. 154(b) by 216 days.

(21) Appl. No.: 10/494,678

(22) PCT Filed: Oct. 23, 2002

(86) PCT No.: PCT/US02/33851

§ 371 (c)(1), (2), (4) Date: May 3, 2004

(87) PCT Pub. No.: WO03/039890

PCT Pub. Date: May 15, 2003

(65) Prior Publication Data

US 2004/0251660 A1    Dec. 16, 2004

Related U.S. Application Data

(60) Provisional application No. 60/336,297, filed on Nov. 2, 2001.

(51) Int. Cl.
*B62D 1/00* (2006.01)
(52) U.S. Cl. ...................................... 280/515
(58) Field of Classification Search ................. 280/504, 280/507, 509, 515
See application file for complete search history.

(56) References Cited

U.S. PATENT DOCUMENTS

| | | | |
|---|---|---|---|
| 2,525,471 A | 10/1950 | Balzer | |
| 3,046,037 A | 7/1962 | Cain | |
| 3,146,003 A | 8/1964 | De Ronde | |

(Continued)

FOREIGN PATENT DOCUMENTS

JP    200110316 A    1/2001

OTHER PUBLICATIONS

Mechanical Engineer's Handbook, p. 10-43 and translation.

*Primary Examiner*—Tony H. Winner
(74) *Attorney, Agent, or Firm*—Price, Heneveld, Cooper, DeWitt & Litton, LLP

(57) ABSTRACT

A hitch coupler (10) including an E-shaped frame (11), a pin (30) and a conical spring (36). The frame (11) includes a back plate (12), a top plate (14), a middle plate (16) and a bottom plate (18). The top (14), middle (16) and the bottom (18) plates include aligned openings. The pin (30) extends through the aligned holes (21, 23, 27) in the top (14), middle (16) and bottom (18) plates, with the pin (30) being configured to slide within the aligned openings (21, 23, 27). The conical spring (36) surrounds and engages the pin (30). The conical spring (36) biases a bottom of the pin (30) through the middle plate (16) and the bottom plate (18). The pin (30) includes a retainer (38) that extends through a slot (37) in the top plate (14) as the pin (30) is pulled against the bias of the spring (36). The retainer (38) abuts against a top of the top plate (14) when the retainer (38) is located above the top plate (14). The retainer (38) is located between the pin (30) and the spring (36).

22 Claims, 9 Drawing Sheets

U.S. PATENT DOCUMENTS

| | | | |
|---|---|---|---|
| 3,190,677 A | 6/1965 | Robbins | |
| 3,542,398 A * | 11/1970 | Melroe | 280/477 |
| 3,912,302 A * | 10/1975 | Patterson | 280/477 |
| 4,073,507 A * | 2/1978 | Dingess | 280/477 |
| 4,111,407 A * | 9/1978 | Stager | 267/166.1 |
| 4,225,149 A * | 9/1980 | Koopman | 280/477 |
| 4,484,760 A * | 11/1984 | Rach | 280/477 |
| 4,552,377 A * | 11/1985 | Folkerts | 280/515 |
| 4,579,364 A | 4/1986 | Kranz | |
| 4,783,094 A | 11/1988 | Sands | |
| 6,193,260 B1 * | 2/2001 | Homan et al. | 280/515 |

* cited by examiner

INDUSTRIAL E-HITCH TRAILER COUPLER

CROSS REFERENCE TO RELATED APPLICATIONS

This application is the National Stage of International Application No. PCT/US02/33851, which claims the benefit of U.S. Provisional Application No. 60/336,297, filed Nov. 2, 2001.

BACKGROUND OF THE INVENTION

The present invention generally relates to a trailer hitch coupler and more particularly relates to a trailer hitch coupler of the type that includes a vertically movable pin for engaging a drawbar eye on a trailer.

Trailer hitch couplers that include a pin that is normally held in place by gravity and some type of retaining mechanism such as a D-ring clip or a spring have been utilized in the industry. These types of hitch couplers are often used, for example, on airport ground equipment to pull various other equipment, such as baggage carts and the like. FIG. 11 illustrates a prior art hitch coupler 100 that includes a frame 111 and a pin 130 having a handle 140 disposed at its upper end. The frame 111 includes a back plate 112 functioning as the mounting plate for mounting the frame to either the rear of the towing vehicle or the front of the towed vehicle. The frame 111 further includes a top horizontal plate 114, a middle horizontal plate 116, and a bottom horizontal plate 118. The middle horizontal plate 116 and the bottom horizontal plate 118 are preferably dimensioned so as to allow the receipt of a drawbar eye 150 therebetween. The middle plate 116 and the bottom plate 118 define a throat 125 for receiving the drawbar eye 150. The pin 130 is configured to slide vertically within the horizontal extending plates 114, 116, and 118. The pin 130 includes a horizontal bar 132 that limits the downward travel of the pin 130 relative to the frame 111 while also cooperating with a washer 134 to provide a biasing surface for the pin 130 relative to a cylindrical spring 136, which extends between the washer 134 and a bottom surface of the upper horizontal plate 114 of the frame 111. The cylindrical spring 136 applies pressure against the washer 134 to bias the pin 130 into an extended, coupled position through the drawbar eye 150. The washer 134 includes a slot 190 that allows the washer 134 to pass by a flange plate 192 extending from the back plate 112. When the pin 130 is in a retracted position, the handle 140 is rotated to move the slot 190 out of alignment with the flange plate 192, thereby resting a bottom surface of the washer 134 on a top of the flange plate 192 to maintain the pin in the retracted position.

However, normal compression springs require a tall hitch frame. Additionally, retaining mechanisms such as the flange/slotted washer, are either not used or are mounted outside the spring between the spring and the frame where it is not easily visible to the user. These types of hitch couplers are generally fairly large and heavy relative to the load that is applied.

Accordingly, there exists a need for a coupling assembly that is more user friendly, compact, stronger, and lighter than prior couplers of a similar nature.

SUMMARY OF THE INVENTION

One aspect of the present invention is to provide a hitch coupler comprising an E-shaped frame, a pin and a conical spring. The E-shaped frame includes a back plate, a top plate connected to a top portion of the back plate, a middle plate connected to a middle portion of the back plate and a bottom plate connected to a bottom portion of the back plate. The top plate, the middle plate and the bottom plate include aligned openings. The pin extends through the aligned openings in the top plate, the middle plate and the bottom plate. The pin is configured to slide within the aligned openings. The conical spring surrounds and engages the pin. The conical spring biases a bottom of the pin through the middle plate and the bottom plate.

Another aspect of the present invention is to provide a hitch coupler comprising an E-shaped frame, a pin and a spring. The E-shaped frame includes a back plate, a top plate connected to a top portion of the back plate, a middle plate connected to a middle portion of the back plate and a bottom plate connected to a bottom portion of the back plate. The top plate, the middle plate and the bottom plate include aligned openings. The pin extends through the aligned openings in the top plate, the middle plate and the bottom plate. The pin is configured to slide within the aligned openings. The spring surrounds and engages the pin. The spring biases a bottom of the pin through the middle plate and the bottom plate. The pin includes a retainer that extends through a slot in the top plate as the pin is pulled against the bias of the spring. The retainer is configured to abut against a top of the top plate when the retainer is located above the top plate to thereby maintain the pin in a retracted position.

Yet another aspect of the present invention is to provide a hitch coupler comprising an E-shaped frame, a pin and a spring. The E-shaped frame includes a back plate, a top plate connected to a top portion of the back plate, a middle plate connected to a middle portion of the back plate and a bottom plate connected to a bottom portion of the back plate. The top plate, the middle plate and the bottom plate include aligned openings. The pin extends through the aligned openings in the top plate, the middle plate and the bottom plate. The pin is configured to slide within the aligned openings. The spring surrounds and engages the pin. The spring biases a bottom of the pin through the middle plate and the bottom plate. The pin includes a retainer configured to maintain the pin in a retracted position, with the retainer being located between the pin and the spring.

It is an aspect of the present invention to provide a more user friendly, compact, stronger, and lighter hitch coupler for use in the airport ground equipment industry as well as other similar industries and applications. To achieve these and other aspects and advantages, the present invention utilizes a conical spring with a retaining mechanism internal to the spring to provide a smaller package, which is stronger and lighter in weight.

These and other features, advantages, and objects of the present invention will be further understood and appreciated by those skilled in the art by reference to the following specification and appended drawings.

DETAILED DESCRIPTION OF THE PREFERRED EMBODIMENTS

Figure 1:
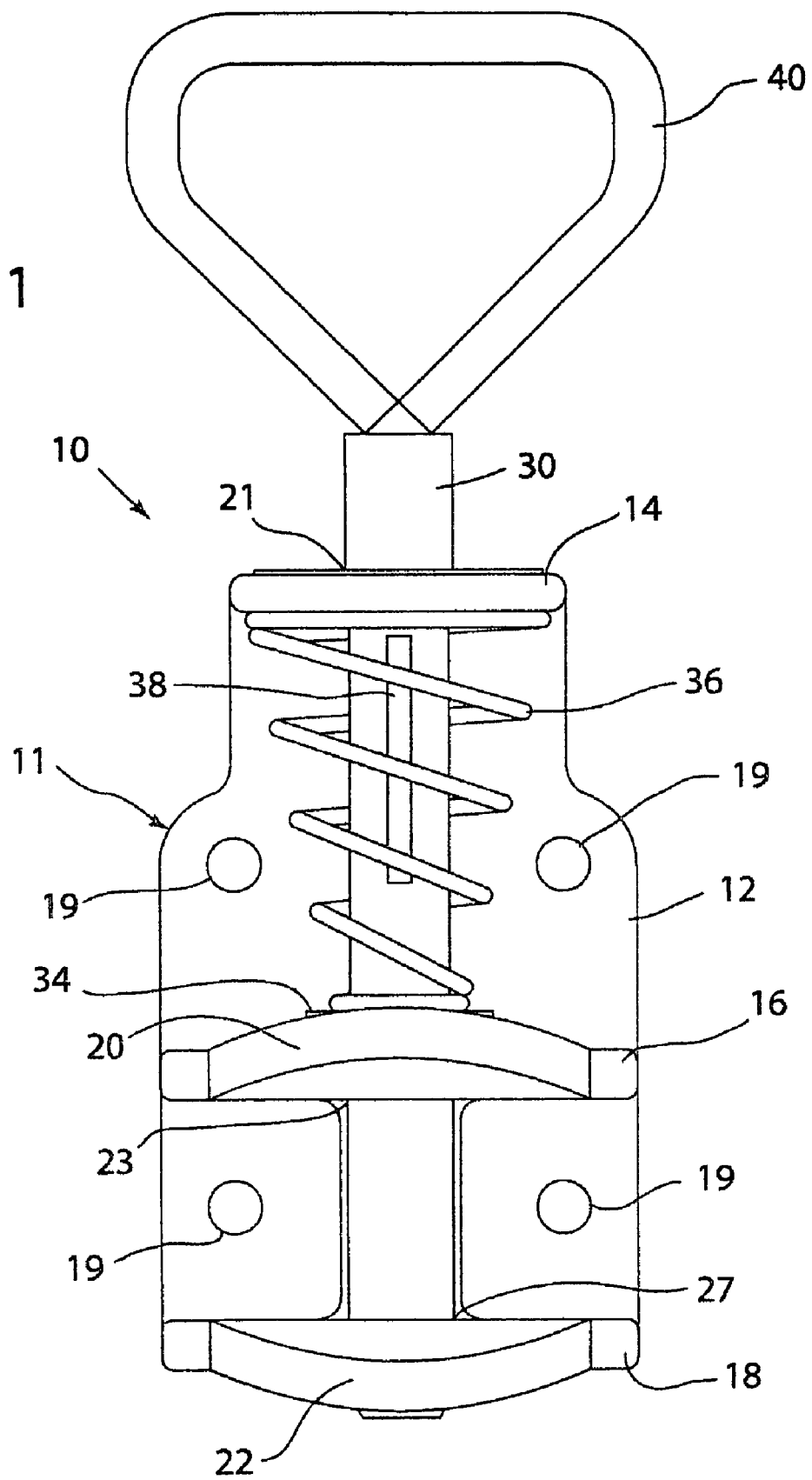
FIG. 1 is a rear elevational view of the trailer hitch coupler constructed in accordance with a first embodiment of the present invention shown with a pin in an extended position.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
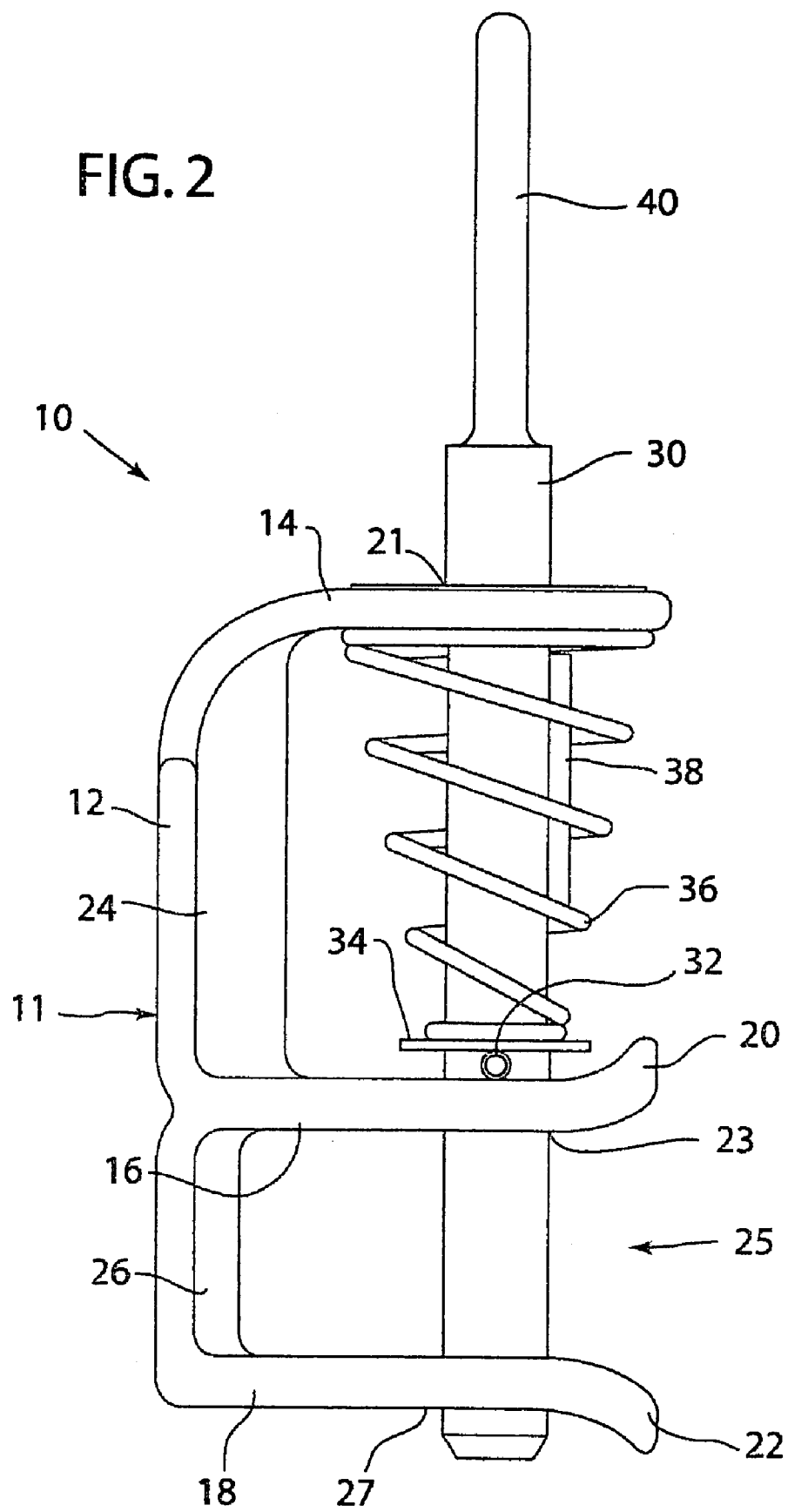
FIG. 2 is a side elevational view showing the hitch coupler of the first embodiment shown with the pin in the extended position.

The reference number 10 (FIGS. 1-8) generally designates a hitch coupler embodying the present invention. In the illustrated example, the hitch coupler includes a frame 11 and a pin 30 having a handle 40 disposed at its upper end. As illustrated in FIG. 2, the frame 11 has an E-shaped profile, thus the references herein to an E-hitch coupler. Specifically, the frame 11 includes a back plate 12 functioning as the mounting plate for mounting the frame to either the rear of the towing vehicle or the front of the towed vehicle. The back plate 12 includes a plurality of holes 19 for receiving fasteners that fasten the hitch coupler 10 to the respective vehicle. The frame 11 further includes a top horizontal plate 14, a middle horizontal plate 16, and a bottom horizontal plate 18. The middle horizontal plate 16 and the bottom horizontal plate 18 are preferably dimensioned so as to allow the receipt of a drawbar eye 50 (see FIG. 8) therebetween while allowing some tolerance for the height of the drawbar eye 50 relative to the hitch coupler 10. A rearward edge 20 of the middle plate 16 is preferably turned slightly upward while a rearward edge 22 of the bottom plate 18 is preferably turned slightly downward so as to define a tapered throat 25 for receiving the drawbar eye 50 of the other vehicle (see FIG. 8). The frame 11 further preferably includes a first vertical strengthening rib 24 extending along the rearward-facing surface of the back plate 12 between the top horizontal plate 14 and the middle horizontal plate 16. The frame 11 further includes a second vertical strengthening rib 26 extending along the rearward-facing surface of the back plate 12 between the middle horizontal plate 16 and the bottom horizontal plate 18.

In the illustrated example, each of the horizontal extending plates 14, 16, and 18 include holes 21, 23, and 27, respectively, that are aligned for receiving the shaft of the pin 30. The pin 30 is configured to slide vertically within holes 21, 23, and 27. The pin 30 preferably has an aperture through which a horizontal bar 32 laterally extends. The bar 32 limits the downward travel of the pin 30 relative to the frame 11 while also cooperating with a washer 34 to provide a biasing surface for the pin 30 relative to a conical spring 36, which extends between the washer 34 and a bottom surface of the top horizontal plate 14 of the frame 11. As described further below, the conical spring 36 becomes compressed between the washer 34 and the bottom surface of the top horizontal plate 14 as the pin 30 is moved into a retracted, uncoupled position for receiving the drawbar eye 50 of a vehicle to be coupled. The conical spring 36 further applies pressure against the washer 34 to bias the pin 30 into an extended, coupled position through the drawbar eye 50.

Figure 3:
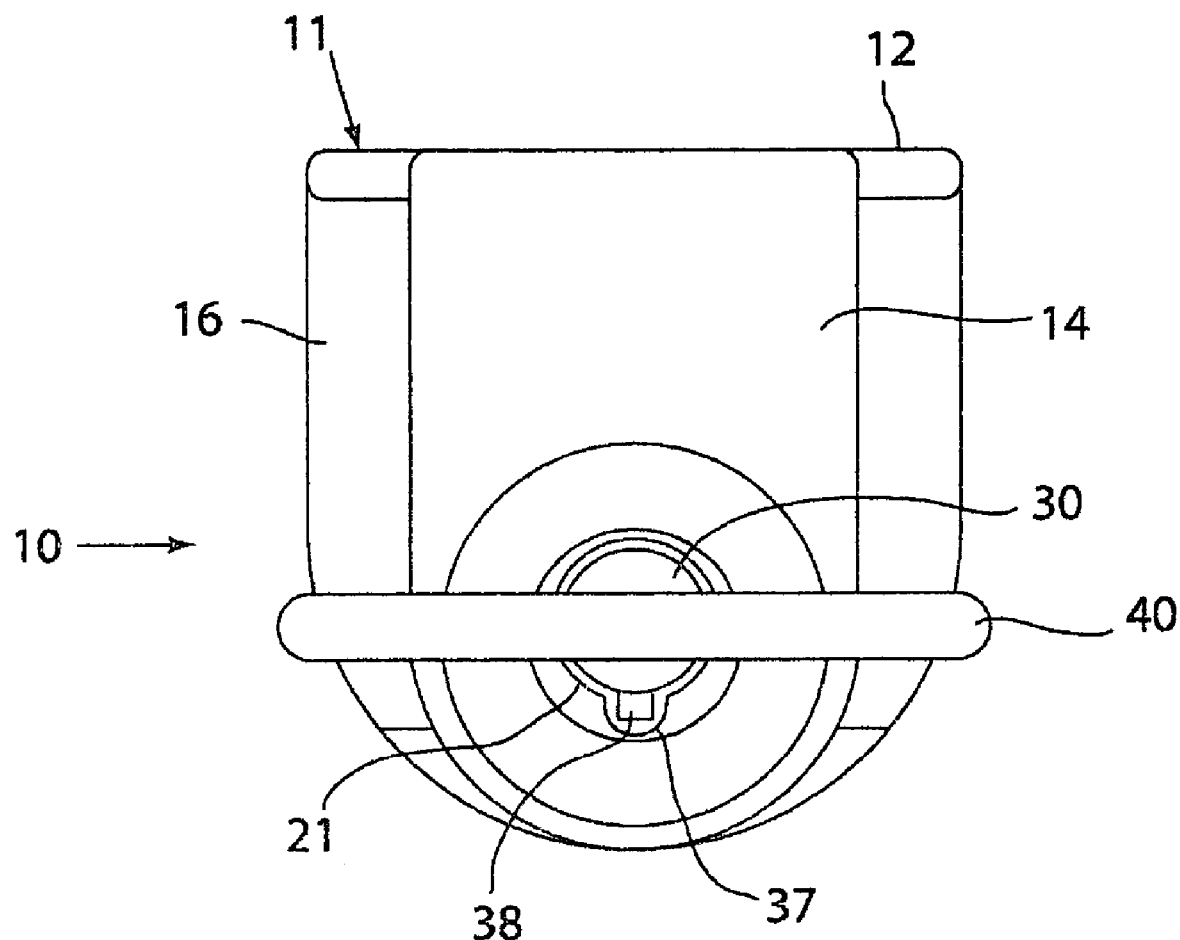
FIG. 3 is a top plan view of the hitch coupler of the first embodiment with the pin in the extended position.
Figure 4:
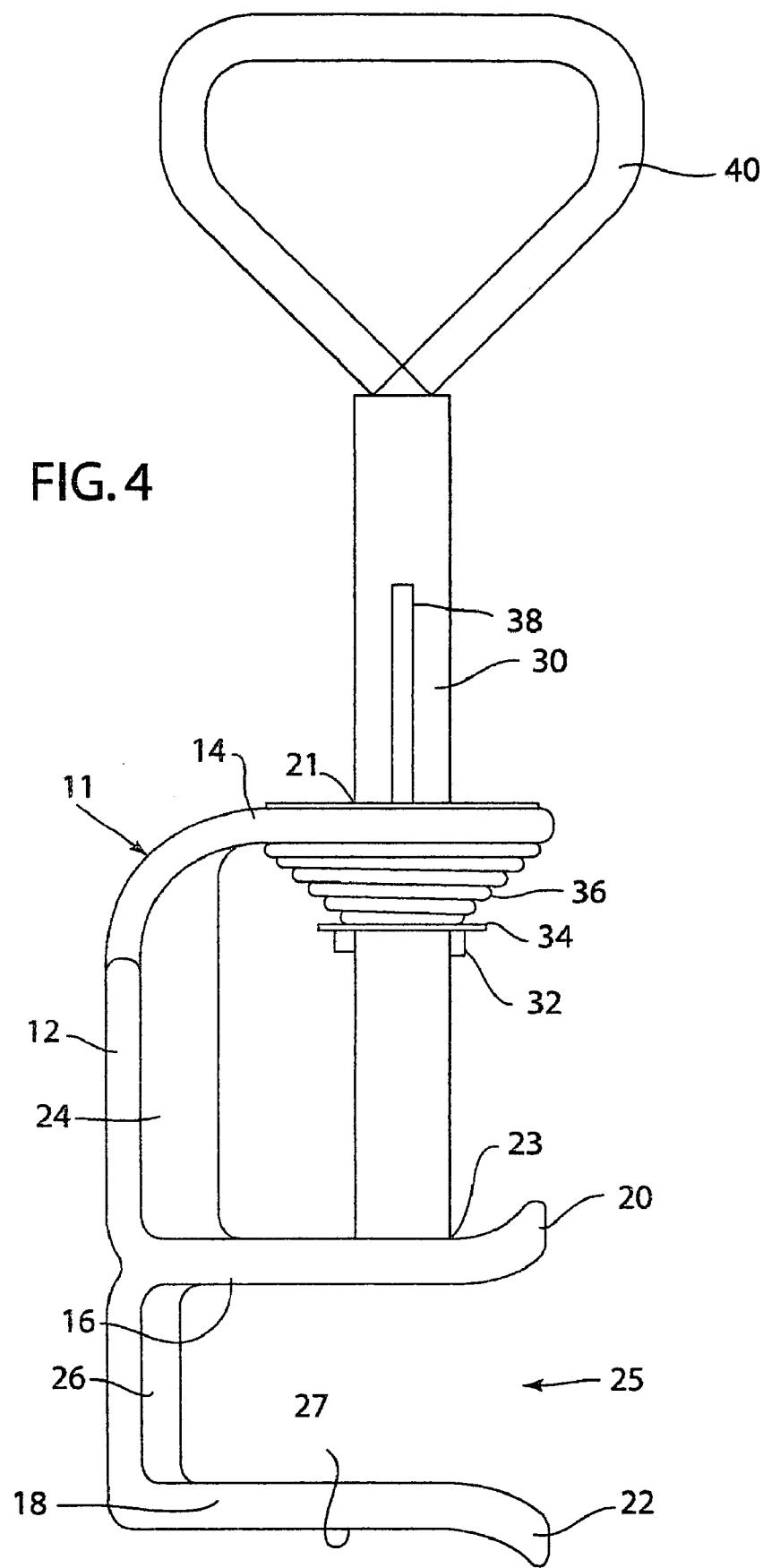
FIG. 4 is a side elevational view of the hitch coupler of the first embodiment with the pin in a retracted position.
Figure 5:
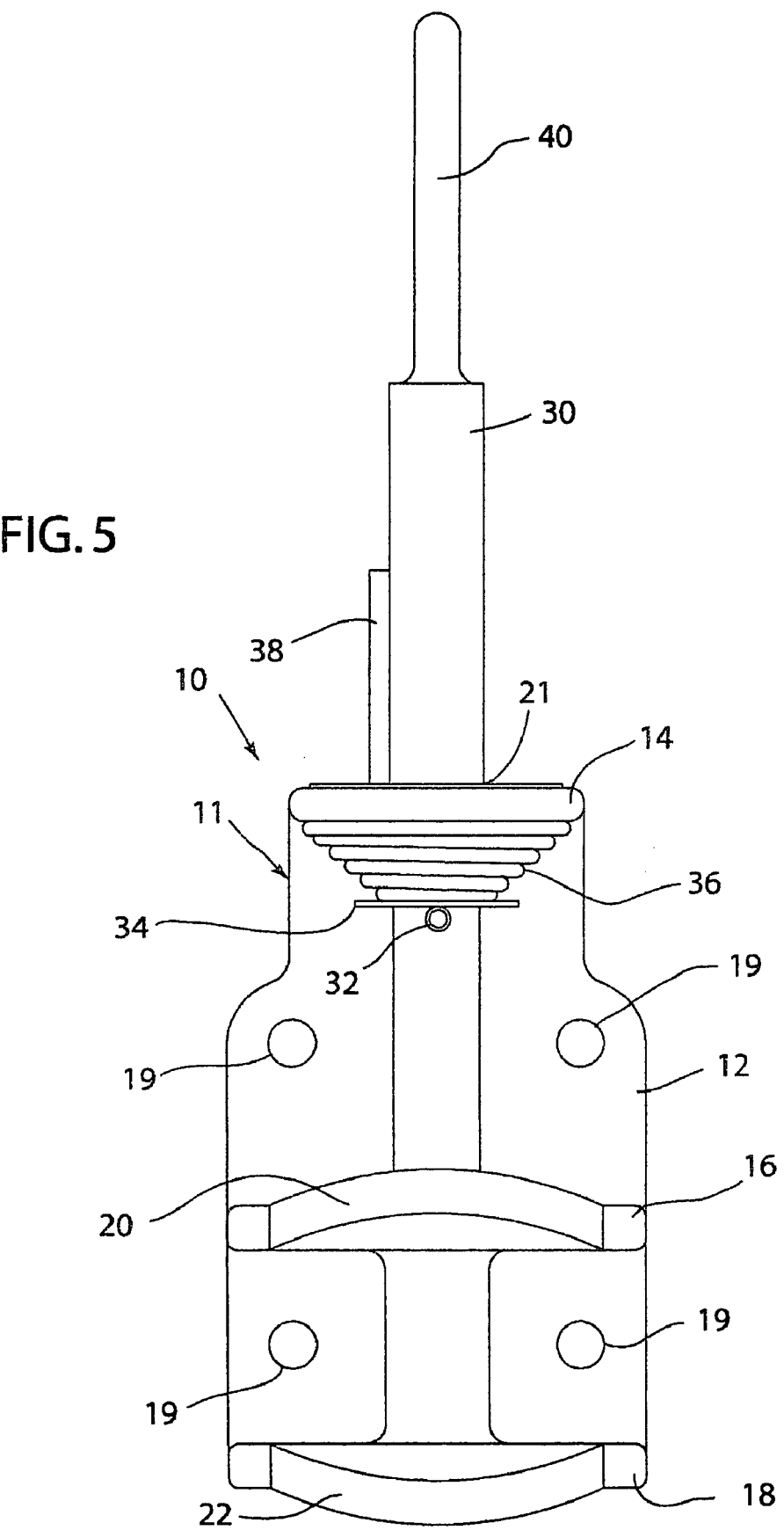
FIG. 5 is a rear elevational view of the hitch coupler of the first embodiment shown with the pin in the retracted position.
Figure 6:
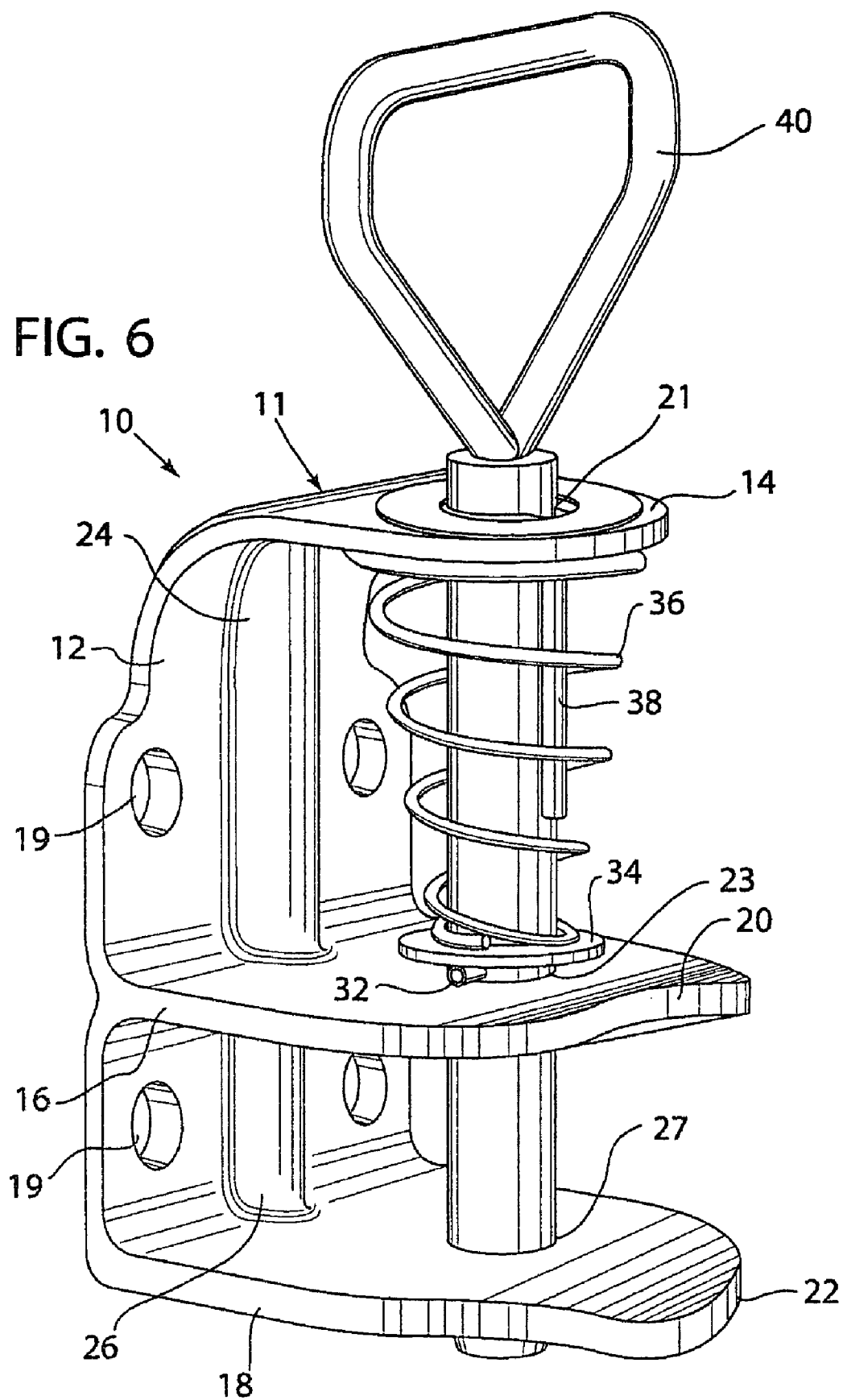
FIG. 6 is a perspective view of the hitch coupler of the first embodiment shown with the pin in the extended position.
Figure 7:
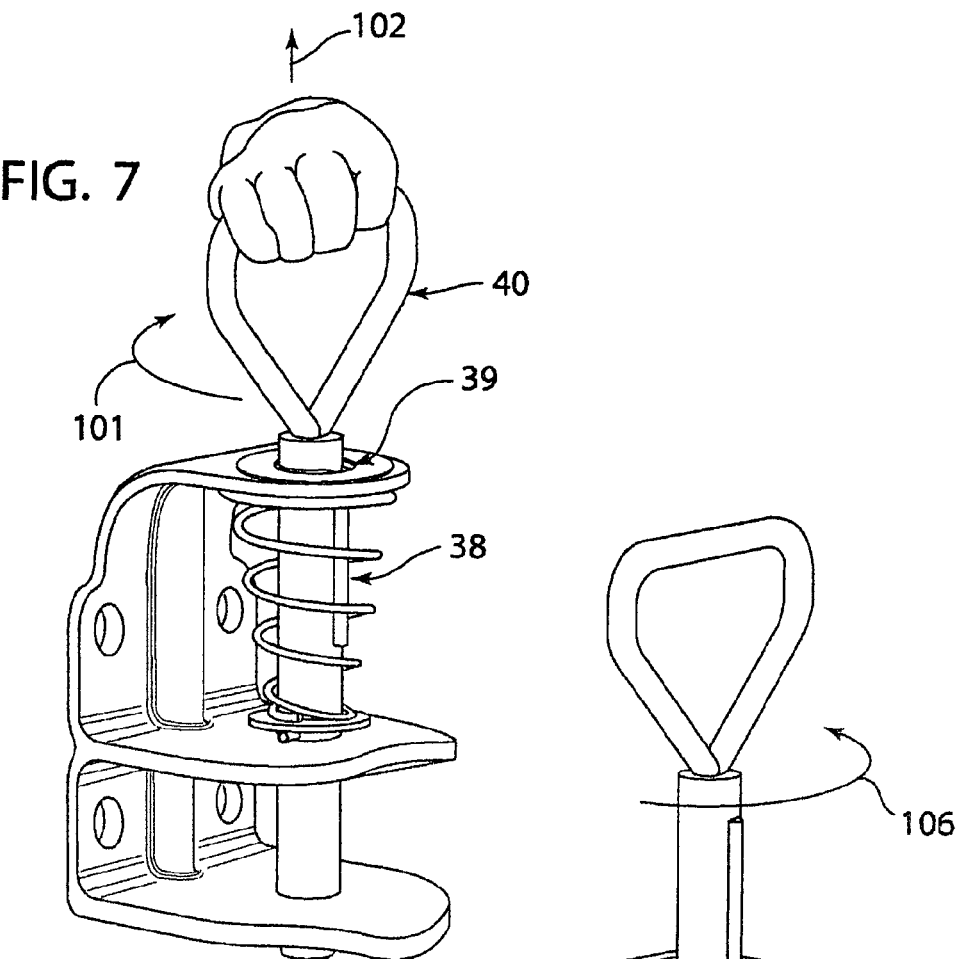
FIG. 7 is a perspective view showing the hitch coupler of the first embodiment in operation with the pin in the extended position.
Figure 8:
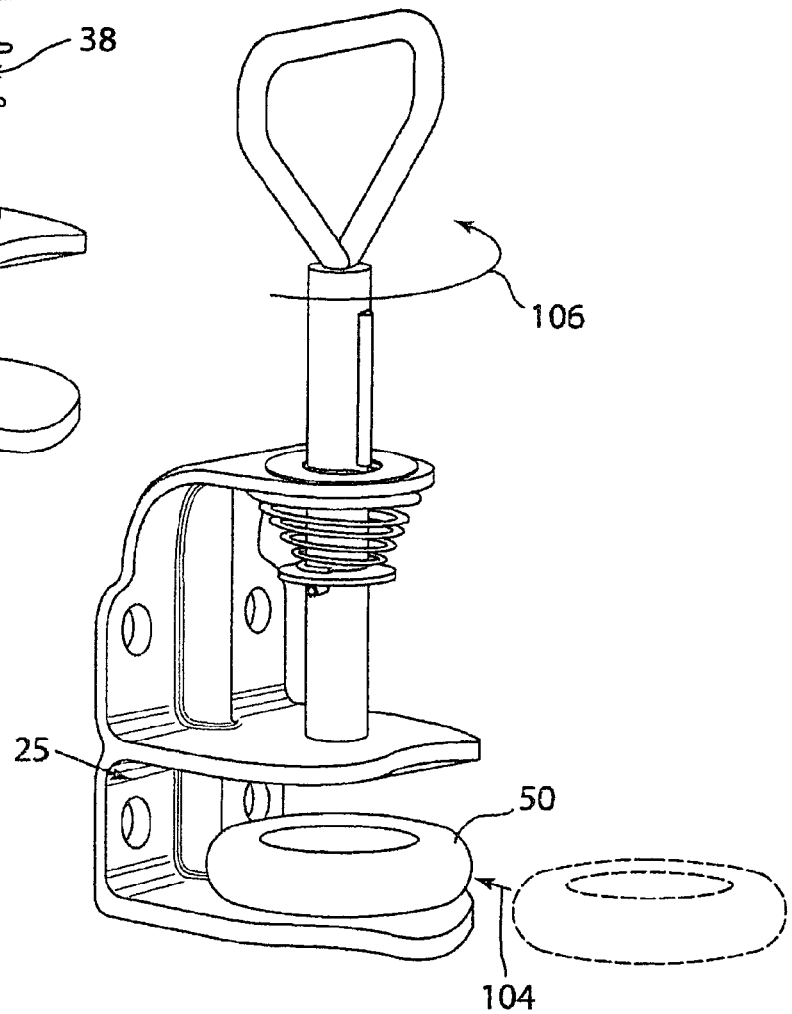
FIG. 8 is a perspective view of the hitch coupler of the first embodiment shown with the pin in the retracted position for receipt of a drawbar eye.

A secondary lockbar/retaining mechanism 38 is preferably provided on the shaft of the pin 30 in a region surrounded by the conical spring 36 as illustrated in the drawings. As best shown in FIG. 3, a hole 21 through the top horizontal plate 14 preferably defines a keyhole 37, which is sized to allow the pin 30 and the secondary lockbar/retaining mechanism 38 to pass through the hole 21 only when the pin 30 is rotated into the proper position. Thus, as shown in FIGS. 7 and 8, the hitch coupler 10 is opened by: (1) grasping and turning the handle 40 in the direction of arrow 101 (or the opposite direction) until the secondary lockbar/retaining mechanism 38 lines up with the keyhole 37 in the top of the frame 11; (2) pulling up on the handle 40 in the direction of arrow 102 until the secondary lockbar/retaining mechanism 38 clears the top of the top horizontal frame plate 14; and (3) rotating the handle 40 in the direction of arrow 106 (or the opposite direction) so that secondary lockbar/retaining mechanism 38 rests on top of the upper surface of the top horizontal plate 14. Next, as shown in FIG. 8, the drawbar eye 50 of the vehicle to be coupled is positioned in the throat 25 and the drawbar eye 50 is aligned under the pin 30. To close the hitch coupler 10, the handle 40 is rotated until the secondary lockbar/retaining mechanism 38 lines up with the keyhole 37. The handle 40 is then released to allow the pin 30 to drop into place, locking the drawbar eye 50 in the frame 11. Finally, the handle 40 is turned 180 degrees to position the secondary lockbar/retaining mechanism 38 at the forwardmost location on the frame 11 to ensure the lock is engaged.

Figure 9:
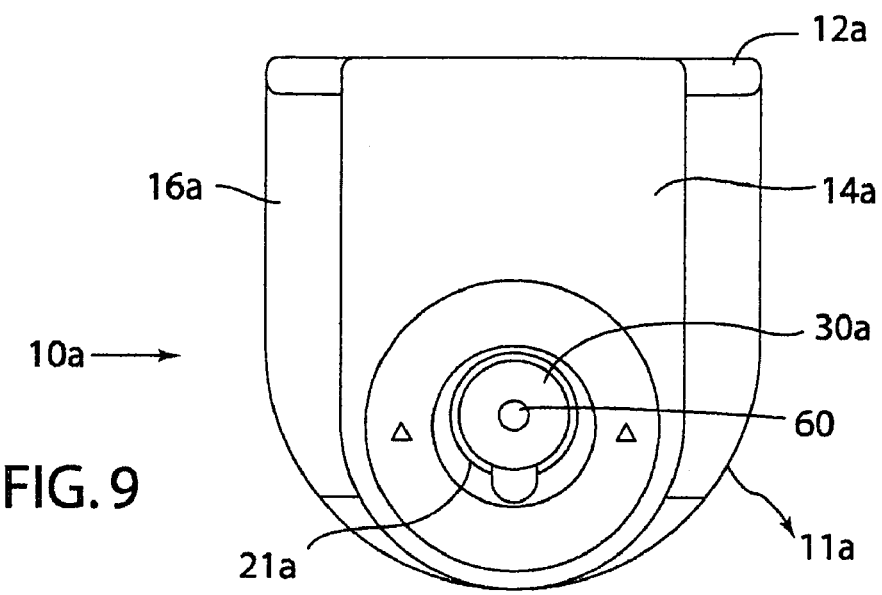
FIG. 9 is a side elevational view of a hitch coupler constructed in accordance with a second embodiment of the present invention.
Figure 10:
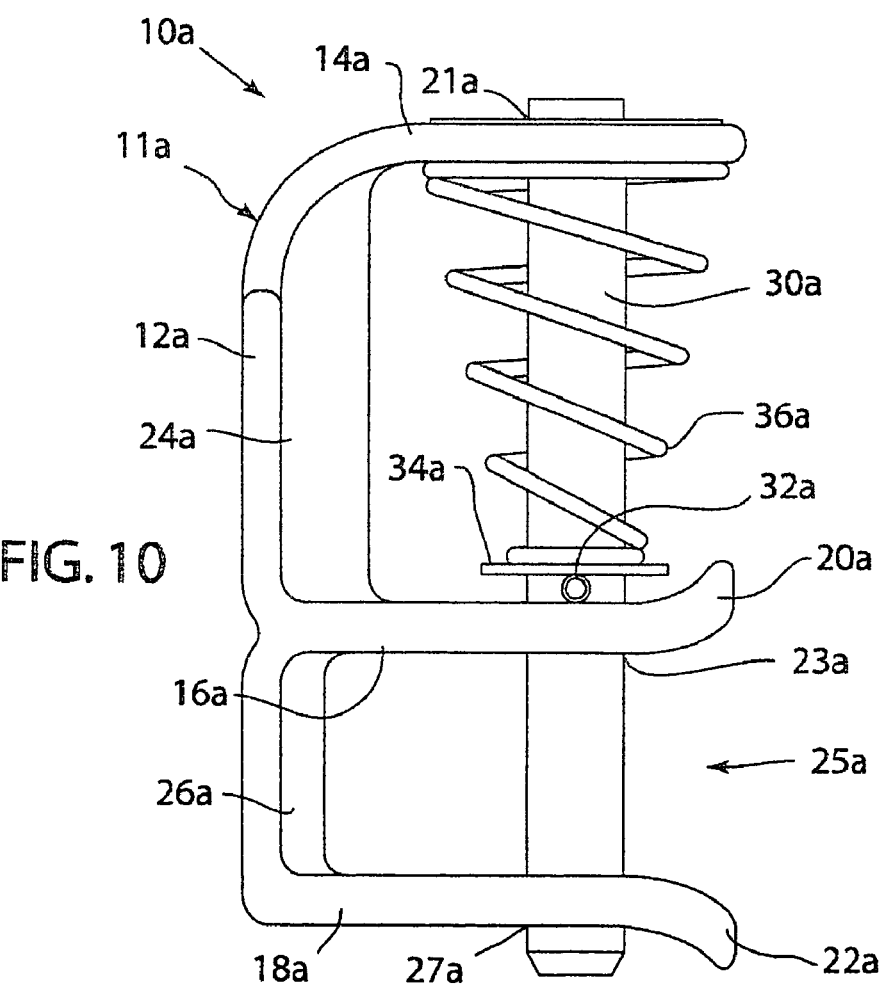
FIG. 10 is a top plan view of the hitch coupler of the second embodiment.
Figure 11:
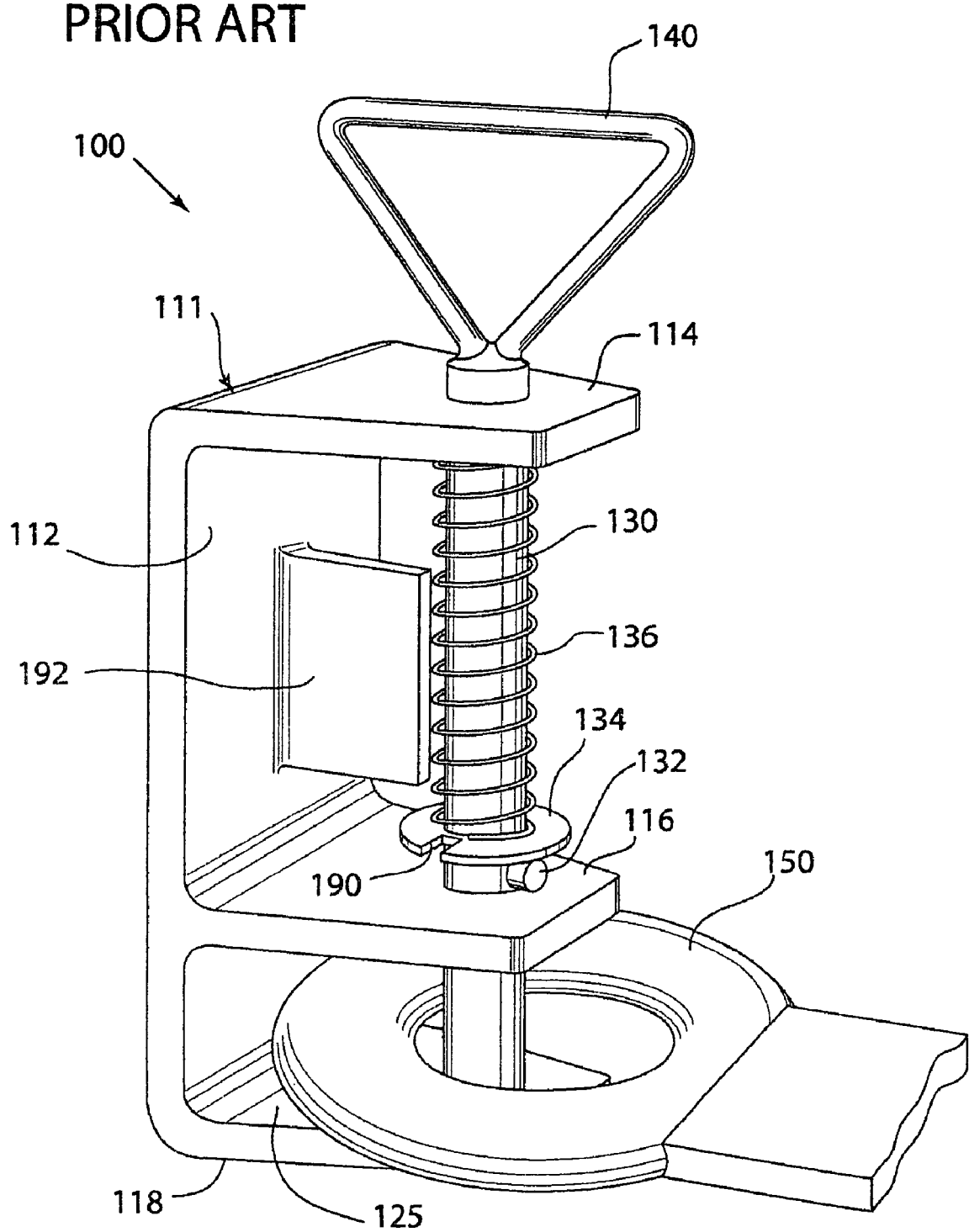
FIG. 11 is a perspective view of a prior art hitch.

The reference numeral 10a (FIGS. 9-10) generally designates another embodiment of the present invention, having a second embodiment for the hitch coupler. Since the second embodiment of the hitch coupler 10a is similar to the previously described hitch coupler 10, similar parts appearing in FIGS. 1-8 and FIGS. 9-10, respectively, are represented by the same, corresponding reference number, except for the suffix "a" in the numerals of the latter. The illustrated second embodiment of the hitch coupler 10a is very similar to the first embodiment, with the exception that the handle 40 is not provided in the second embodiment, but rather a tapped hole 60 is provided in the top of the pin 30a. Additionally, the secondary lockbar/retaining mechanism 38 is not provided in the second embodiment of the hitch coupler 10a. The tapped hole 60 (see FIG. 9) is provided to allow for connection to an actuating assembly (not shown) that allows remote operation of the pin 30a, such as in the vehicle cab having the hitch coupler 10 of FIGS. 9 and 10.

The hitch coupler of the present invention allows the frame to be much smaller than prior art frames because the conical spring can be compressed into a shorter vertical space than the cylindrical spring used in the prior art hitch couplers. Additionally, the hitch coupler of the present invention can include a highly visible secondary lockbar retaining, mechanism that provides visible verification of the locked state of the hitch coupler upon casual visual inspection of the hitch coupler.

The above description is considered that of the preferred embodiments only. Modification of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A hitch coupler comprising:
   an E-shaped frame including a back plate, a top plate connected to a top portion of the back plate, a middle plate connected to a middle portion of the back plate and a bottom plate connected to a bottom portion of the back plate, the top plate, the middle plate and the bottom plate including aligned openings;
   a pin extending through the aligned openings in the top plate, the middle plate and the bottom plate, the pin being configured to slide within the aligned openings;
   a conical spring surrounding and engaging the pin, the conical spring biasing a bottom of the pin through the middle plate and the bottom plate;
   a first vertical strengthening rib extending along a rearward-facing surface of the back plate between the upper plate and the middle plate; and
   a second vertical strengthening rib extending along the rearward-facing surface of the back plate between the middle plate and the bottom plate.

2. A hitch coupler comprising:
   an E-shaped frame including a back plate, a top plate connected to a top portion of the back plate, a middle plate connected to a middle portion of the back plate and a bottom plate connected to a bottom portion of the back plate, the top plate, the middle plate and the bottom plate including aligned openings;
   a pin extending through the aligned openings in the top plate, the middle plate and the bottom plate, the pin being configured to slide within the aligned openings; and
   a conical spring surrounding and engaging the pin, the conical spring biasing a bottom of the pin through the middle plate and the bottom plate;
   wherein the pin includes a retainer that extends through a slot in the top plate as the pin is pulled against the bias of the spring, the retainer being configured to abut against a top of the top plate when the retainer is located above the top plate to thereby maintain the pin in a retracted position.

3. The hitch coupler as set forth in claim 2, wherein:
   the retainer is located between the pin and the spring.

4. The hitch coupler as set forth in claim 2, wherein:
   the retainer comprises a vertical rib; and
   the slot in the top plate is connected to the opening in the top plate to define a keyhole opening.

5. A hitch coupler comprising:
   an E-shaped frame including a back plate, a top plate connected to a top portion of the back plate, a middle plate connected to a middle portion of the back plate and a bottom plate connected to a bottom portion of the back plate, the top plate, the middle plate and the bottom plate including aligned openings;
   a pin extending through the aligned openings in the top plate, the middle plate and the bottom plate, the pin being configured to slide within the aligned openings; and
   a spring surrounding and engaging the pin, the spring biasing a bottom of the pin through the middle plate and the bottom plate;
   wherein the pin includes a retainer that extends through a slot in the top plate as the pin is pulled against the bias of the spring, the retainer being configured to abut against a top of the top plate when the retainer is located above the top plate to thereby maintain the pin in a retracted position.

6. The hitch coupler as set forth in claim 5, wherein:
   the pin includes a handle for facilitating hand operated movement of the pin through the aligned openings.

7. The hitch coupler as set forth in claim 5, wherein:
   a rearward edge of the middle plate is curved upward while a rearward edge of the bottom plate is curved downward so as to define a tapered throat for receiving a drawbar eye.

8. The hitch coupler as set forth in claim 5, further including:
   a first vertical strengthening rib extending along a rearward-facing surface of the back plate between the upper plate and the middle plate; and
   a second vertical strengthening rib extending along the rearward-facing surface of the back plate between the middle plate and the bottom plate.

9. The hitch coupler as set forth in claim 5, wherein:
   the pin includes a bar extending therethrough, the bar limiting downward travel of the pin relative to the B-shaped frame.

10. The hitch coupler as set forth in claim 9, further including:
    a washer surrounding the pin;
    wherein the bar cooperates with the washer to provide a biasing surface for the pin relative to the conical spring.

11. The hitch coupler as set forth in claim 5, wherein:
    the pin includes a tapped hole in a top thereof configured to accept an actuating assembly for allowing remote manipulation of the pin to slide the pin through the aligned openings.

12. The hitch coupler as set forth in claim 11, wherein:
    the retainer is located between the pin and the spring.

13. The hitch coupler as set forth in claim 11, wherein:
    the retainer comprises a vertical rib; and
    the slot in the top plate is connected to the opening in the top plate to define a keyhole opening.

14. A hitch coupler comprising:
    an E-shaped frame including a back plate, a top plate connected to a top portion of the back plate, a middle plate connected to a middle portion of the back plate and a bottom plate connected to a bottom portion of the back plate, the top plate, the middle plate and the bottom plate including aligned openings;
    a pin extending through the aligned openings in the top plate, the middle plate and the bottom plate, the pin being configured to slide within the aligned openings; and
    a spring surrounding and engaging the pin, the spring biasing a bottom of the pin through the middle plate and the bottom plate;
    wherein the pin includes a retainer configured to maintain the pin in a retracted position, the retainer being located between the pin and the spring; and
    a first vertical strengthening rib extending along a rearward-facing surface of the back plate between the upper plate and the middle plate; and a second vertical strengthening rib extending along the rearward-facing surface of the back plate between the middle plate and the bottom plate.

15. The hitch coupler as set forth in claim 14, wherein:
the pin includes a handle for facilitating hand operated movement of the pin through the aligned openings.

16. The hitch coupler as set forth in claim 14, wherein:
a rearward edge of the middle plate is curved upward while a rearward edge of the bottom plate is curved downward so as to define a tapered throat for receiving a drawbar eye.

17. The hitch coupler as set forth in claim 14, wherein:
the pin includes a bar extending therethrough, the bar limiting downward travel of the pin relative to the E-shaped frame.

18. The hitch coupler as set forth in claim 17, further including:
a washer surrounding the pin;
wherein the bar cooperates with the washer to provide a biasing surface for the pin relative to the spring.

19. The hitch coupler as set forth in claim 14, wherein:
the pin includes a tapped hole in a top thereof configured to accept an actuating assembly for allowing remote manipulation of the pin to slide the pin through the aligned openings.

20. The hitch coupler as set forth in claim 14, wherein:
the retainer extends through a slot in the top plate as the pin is pulled against the bias of the spring, the retainer being configured to abut against a top of the top plate when the retainer is located above the top plate to thereby maintain the pin in the retracted position.

21. The hitch coupler as set forth in claim 14, wherein:
the spring is conical.

22. A hitch coupler comprising:
an E-shaped frame including a back frame section, a top frame section connected to a top portion of the back frame section, a middle frame section connected to a middle portion of the back frame section and a bottom frame section connected to a bottom portion of the back frame section, the top frame section, the middle frame section and the bottom frame section including aligned openings;
a pin extending through the aligned openings in the top frame section, the middle frame section and the bottom frame section, the pin being configured to slide within the aligned openings; and
a spring surrounding and engaging the pin, the spring biasing a bottom of the pin through the middle frame section and the bottom frame section;
wherein the pin includes a retainer that extends through a slot in the top frame section as the pin is pulled against the bias of the spring, the retainer being configured to abut against a top of the top frame section when the retainer is located above the top frame section to thereby maintain the pin in a retracted position.

* * * * *

UNITED STATES PATENT AND TRADEMARK OFFICE
CERTIFICATE OF CORRECTION

PATENT NO. : 7,398,987 B2 Page 1 of 1
APPLICATION NO. : 10/494678
DATED : July 15, 2008
INVENTOR(S) : David O. Roe et al.

It is certified that error appears in the above-identified patent and that said Letters Patent is hereby corrected as shown below:

Column 1, line 8, "60/336,297" should be -- 60/336,279 --.

Column 6, claim 9, line 28, "B-shaped" should be -- E-shaped --.

Signed and Sealed this

Sixteenth Day of December, 2008

JON W. DUDAS
*Director of the United States Patent and Trademark Office*